United States Patent [19]

Eisenberg et al.

[11] Patent Number: 4,607,861
[45] Date of Patent: Aug. 26, 1986

[54] HYDRAULIC STABILIZING SYSTEM FOR VEHICLE SUSPENSION

[75] Inventors: Sidney W. Eisenberg, Linden; Gregory J. Johnson, Grand Blanc, both of Mich.

[73] Assignee: General Motors Corporation, Detroit, Mich.

[21] Appl. No.: 682,295

[22] Filed: Dec. 17, 1984

[51] Int. Cl.$^4$ .............................................. B60G 9/00
[52] U.S. Cl. ................................ 280/702; 267/11 A; 280/689
[58] Field of Search .................. 267/10, 11 A, 64.11, 267/DIG. 1, DIG. 2; 280/689, 702, 709

[56] References Cited

U.S. PATENT DOCUMENTS

| | | | |
|---|---|---|---|
| 1,647,518 | 11/1927 | Hawley, Jr. | 267/11 A |
| 3,328,019 | 6/1967 | Wilson | 267/11 A |
| 3,533,425 | 10/1970 | Hannan | 267/11 A |
| 3,563,566 | 2/1971 | Weber | 267/11 A |
| 3,779,535 | 12/1973 | Strand | 267/64 |
| 3,871,635 | 3/1975 | Unruh et al. | 267/11 A |

Primary Examiner—Richard A. Bertsch
Attorney, Agent, or Firm—Dean L. Ellis

[57] ABSTRACT

A roll stabilizing system for vehicle wheel spring suspension includes piston and cylinder units mounted between the chassis and respective suspension control arms at opposite sides of the vehicle to counteract roll of the vehicle sprung mass during cornering maneuvers. A single ended piston rod in each cylinder unit defines pressure chambers of unequal cross-sectional area and adverse affects of such inequality on the suspension system are prevented by a force compensating hydraulic circuit including additional piston and cylinder combinations responsive to hydraulic pressures sustained in the suspension control arm hydraulic units.

2 Claims, 3 Drawing Figures

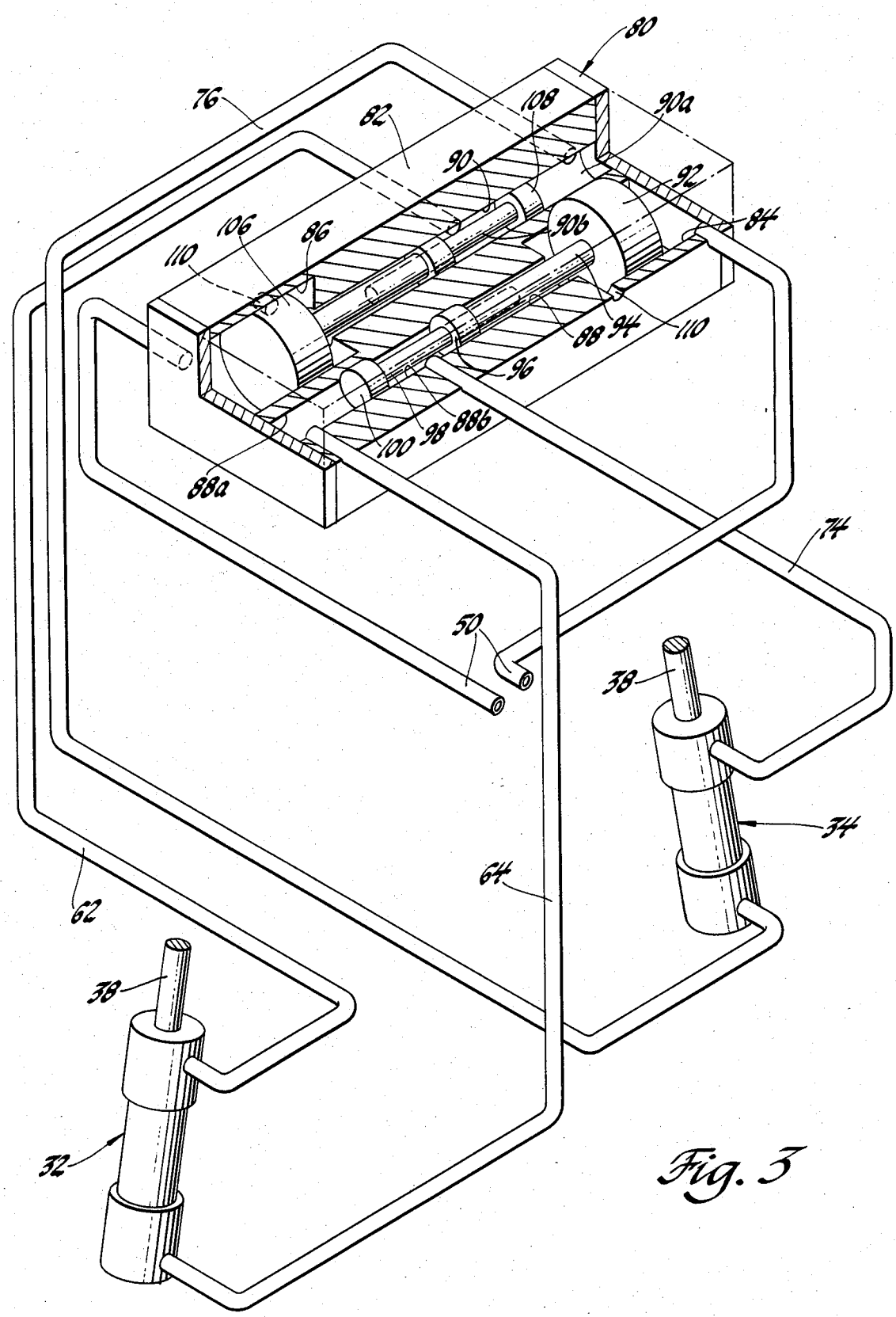

HYDRAULIC STABILIZING SYSTEM FOR VEHICLE SUSPENSION

This invention relates to vehicle spring suspensions and more particularly to stabilizing means for such suspensions effective to counteract roll, pitch or like relative displacements of the vehicle sprung mass from an equilibrium position as during cornering maneuvers or when traversing bumpy and wavy roads.

More specifically, the invention is directed to a hydraulic roll, pitch, or like stabilizing system wherein hydraulic piston and cylinder units are applied between the sprung and unsprung masses of the vehicle adjacent respective road wheel axles or suspension arms and have crossconnected pressure chambers which counteract centrifugal, vertical, etc. forces moving the vehicle sprung mass from such equilibrium position. As proposed, these hydraulic systems are intended to supplant or complement conventional stabilizer torsion bar equipment incorporated in vehicle suspension apparatus.

An example of prior such hydraulic stabilizing systems is disclosed in Wilson, U.S. Pat. No. 3,328,019, issued June 27, 1967, wherein a pair of such piston and cylinder units are applied to counteract vehicle body roll during cornering. In this instance, the hydraulic units each comprise a piston rod extending completely through the cylinder to define with its piston head a pair of equal area hydraulic roll stabilizing chambers crossconnected to exert hydraulic resistance to roll deflection of the vehicle sprung mass. Such a system has the disadvantage of undue complexity in the structure and attachment of the hydraulic units incident to the full length piston rod and its requirements for additional chamber sealing, added mass, etc.

Another type of such hydraulic piston and cylinder stabilizing apparatus is shown in Strand, U.S. Pat. No. 3,779,535, issued Dec. 20, 1971. There, a so called single ended piston arrangement has the piston rod extending to the exterior of the cylinder pressure chambers at only one thereof so that unit and structural attachment complexity and mass are reduced.

However, we have determined after extensive work in incorporating this latter type of single ended piston system in conventional suspensions, that frustrating adverse effects on suspension performance unavoidably accompany the gains accomplished in, for example, roll stability. These unwanted effects include alteration of the normal trim height of the vehicle body over the wheels, as well as upset of the carefully tuned ride rate and damping properties of the original suspension apparatus.

Further, where a pressurized hydraulic accumulator is included in the stabilizer system to fix the degree of hydraulic resistance in the units to roll deflection in the suspension, similar adverse effects are encountered. Strand, or the similar system in Unruh, U.S. Pat. No. 3,871,635, are exemplary of included hydraulic accumulators pressurizing the stabilizing units and in either, it is unavoidable that any substantial amount of accumulator pressure will act on the unequal area cross-connected chambers of the stabilizing units to cause an unwanted lifting of the vehicle body over the axle from the trim height purposely obtained in the suspension by the vehicle manufacturer.

By the present invention these difficulties are eliminated and a single ended cross-connected hydraulic unit stabilizing system is made practical for application in any modern motor car. The invention has as its principal object such foregoing practical utility for single ended systems and has as its further object the provision of a hydraulic roll or like stabilizing system incorporating such single ended units, and further incorporating means which will compensate for the differential area created in the opposing chambers of each such unit by the presence of the single ended piston rod in such a way that the system will operate to prevent all force in the hydraulic units on the suspension except to counteract the conditions for which they are specifically employed, e.g., resistance to roll deflection of the sprung mass over the unsprung mass during cornering, etc.

The invention features a hydraulic stabilizing system for vehicle suspension including single ended hydraulic piston and cylinder units and apparatus cross connecting the chambers of such single ended piston and cylinder units and further including expansible chamber devices as a selected best mode for accomplishing the compensating function. In an exemplary embodiment of this mode, additional piston and cylinder devices are incorporated each within one of the hydraulic circuits cross connecting the suspension units opposing chambers. Pistons moveable within the cylinders of these additional units respond to the pressures created in the cross-connected suspension unit chambers during various vehicle ride and/or cornering conditions in such a way that the unequal areas of the suspension unit chambers are neutralized from exhibiting any unwanted force conditions between the sprung and unsprung masses of the vehicle.

These and other objects and features of the invention will become readily apparent from the specification and from the drawings wherein:

FIG. 3 is a perspective schematic representation of an illustrative embodiment of a portion of a system according to the invention with parts broken away.

Figure 1:
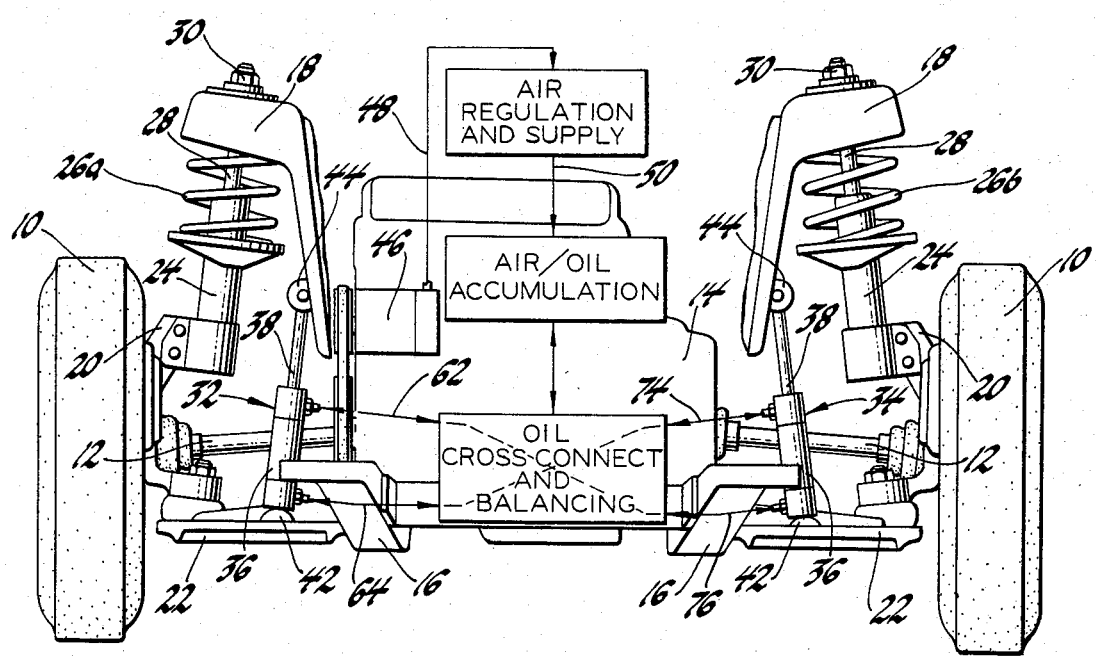
FIG. 1 is a fragmentary front elevational view of a vehicle partially broken away and showing a hydraulic stabilizing system according to this invention represented partly in diagrammatic fashion.

Referring now to FIG. 1, there is illustrated the engine, drive and front suspension aggregate for a front wheel drive style vehicle of generally well known character incorporating a pair of front steerable road wheels 10 driven by front half drive shafts 12 extending from the engine, transmission and differential unit indicated generally at 14. Such unit 14 is suitably secured in known manner to a mounting cradle or suitable like structure having frame-like rails 16 at lower margins of a vehicle sheet metal chassis integrated with the vehicle body. In the forward portions of the vehicle, further such chassis sheet metal structure includes strut mounting frame towers 18 which together with frame rails 16, drive units 14 and remaining parts of the chassis/body constitute the mass of the vehicle to be spring supported upon wheels 10, i.e., the vehicle sprung mass.

Generally conventional substantially mirror-image front suspension elements at each side of the vehicle include a forged or like wheel carrier or knuckle 20 accepting the drive shafts 12 and mounting the wheels 10, a lower transverse control arm 22 pivotally secured at its outer end to the lower end of knuckle and at its inner end upon a rail 16. A suspension strut assembly 24 is affixed at its lower end to the upper end of knuckle 20 and, as is well known, constitutes a telescopic damper unit the lower portion of which seats a primary coil suspension spring 26a or 26b and the upper portion of which is a piston rod 28 secured by suitable means 30 to a respective frame tower 18. The upper ends of coil springs 26a and 26b also seat on such towers. Thus, these described suspension elements together with road wheels 10 constitute the unsprung mass of the front end of the vehicle enabling resiliently cushioned and hydraulically dampened relative motion between the masses of the vehicle during various road operating conditions. Springs 26a and 26b together with similar spring(s) at the rear of the sprung mass, support the same in an equilibrium or "trim" position when the vehicle is at rest.

Among the various road conditions, of course, are cornering situations in which as the vehicle negotiates a curve the sprung mass tends to lean or roll in one direction under the centrifugal force applied thereto so as to, for the example of one turn direction, further compress coil spring 26a and reduce load on coil spring 26b. A hydraulic lower stabilizing system according to this invention is applied to the vehicle suspension apparatus in order to counteract to a selected degree such roll of the sprung mass.

The system is diagrammatically represented in FIG. 1 and includes a pair of identical hydraulic piston cylinder units generally indicated at 32 or 34. As seen also in FIG. 2, each comprises a cylinder portion 36 receiving in suitably sealed manner a piston rod 38 carrying a piston head 40 sealedly fitted to the cylinder interior to define opposite upper and lower uncommunicated pressure chambers. The lower end of each cylinder 36 is suitably pivotally secured at 42 to a respective control arm 22, while the upper distal end of piston rod 38 is likewise pivotally secured to frame towers 18 as at 44. Inasmuch as the lower or inner distal end of piston rod 38 carrying piston head 40 resides in only one of the two hydraulic chambers defined in each unit 32 or 34, the hydraulic pressure area of the cross section through such units is, of course, of unequal amount in the two chambers as represented by the differential area of the piston rod 38.

Roll or lean of the vehicle sprung mass is counteracted by hydraulically cross connecting, for example, the lower oil-filled chamber of unit 32 with the upper oil-filled chamber of unit 34 via a pipe. Hence, during vehicle cornering producing centrifugal force on the sprung mass tending to compress or further load coil spring 26a, a force is applied contracting unit 32 to move its piston rod 38 downwardly. Concurrently, spring 26b is unloaded and piston rod 38 of unit 34 tends to be moved upwardly. Such contraction of the lower chamber of the unit 32 concurrently with contraction of the upper chamber of unit 34 is resisted by the hydraulic pressure created therewithin.

While prior art systems as enumerated hereinabove appeared effective for the stated purpose of roll stabilization, attempts to employ them in practice have proven unsuccessful. When applying single ended units such as therein described to conventional suspension apparatus of a modern vehicle, the normal suspension characteristics are altered in an undesirable way. For example, it was found that when applying the pressurized air/oil accumulators of such prior systems to such cross-connected units to select an effective level of resistance to roll of the sprung mass, any application of accumulator pressure to the crossconnected circuits undesirably lifted the sprung mass above its normal trim height over the wheels 10. That is, units 32 and 34 became force applying devices assisting the coil spring 26a and 26b in supporting the sprung mass. Further, it was found that during normal road operation with such a system, the movements of road wheels 10 from bumps and the like tended to have the same effect of lifting the vehicle sprung mass above normal trim height.

Figure 2:
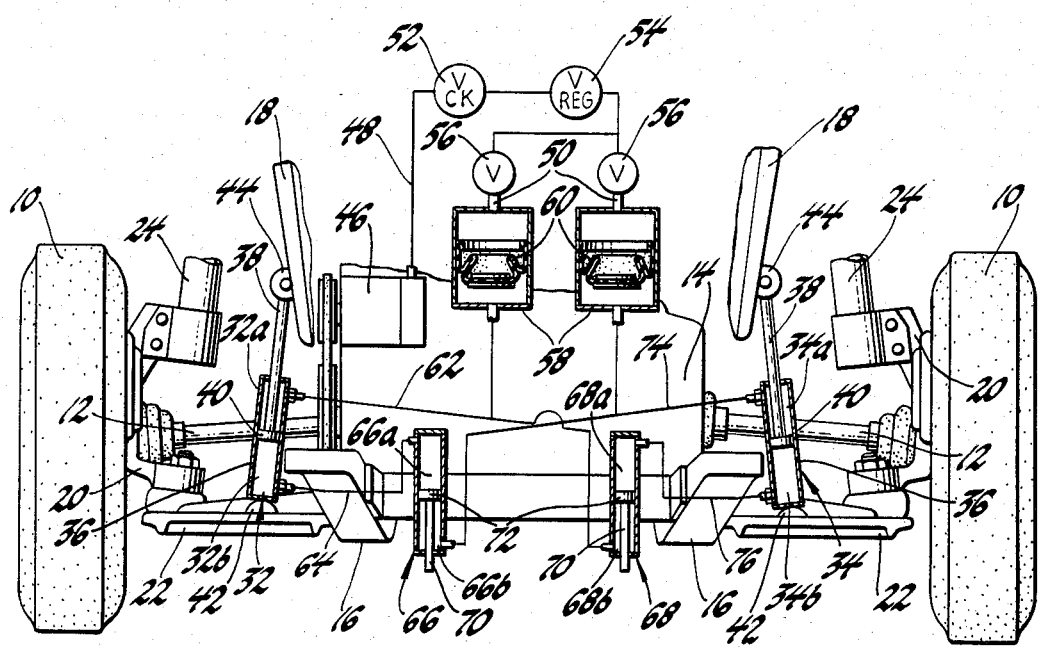
FIG. 2 is a view similar to FIG. 1 but illustrating the hydraulic stabilizing system of the invention in greater detail diagrammatically.

We have discovered that these undesirable effects must be due to the unequal cross-sectional area of the upper and lower chambers of each unit such as 32 and 34 occasioned by the presence of the piston rod 38 in only one thereof. We further discovered a hydraulic roll stabilizing system effective to cure those effects, and it is represented diagrammatically in FIG. 1. Since it is expected that the vehicle operator will desire not only to have these defects eliminated but further be able to select the degree of roll resistance available from the system, we provide an engine-driven air pump 46 connected by line 48 to air regulation and supply means which may be connected by line 50 to conventional air/oil accumulators. As seen in FIG. 2, the air regulation and supply means may comprise a check valve 52 connected in series with an operator-adjustable regulator valve 54 of known construction. Line 50 may connect in parallel circuits from a pair of solenoid or like-operated on/off valves 56 also operable at the will of the vehicle operator to either supply or shut the accumulators with or from the regulated pressure. Specifically, each accumulator may comprise a device 58 of known character generally employing a flexible wall 60 or like piston apparatus separating a body of compressed air in an upper chamber from a lower oil-filled or like hydraulic chamber.

Each accumulator 58 has its lower oil-filled chamber included in a pressure circuit defined by cross-connected chambers of the units 32 and 34, further including suitable conduits such as 62 cross-connecting the upper chamber 32a of unit 32 and the lower chamber 34b of unit 34, and conduit 64 connecting the lower chamber 32b of the unit 32 and the upper chamber 34a of unit 34. To compensate for the unequal cross-sectional area of each interconnected pair of these suspension unit chambers, balance means are provided in the form of additional, identical piston and cylinder units 66 and 68 included in the respective cross-connecting pressure circuits. These units have no force bearing function in the vehicle suspension structure but may simply have their cylinder portions suitably mounted on the vehicle chassis and each carry therewithin a singled ended piston rod 70 identical to piston rods 38. Such piston rods are each suitably sealed to their cylinder for reciprocation therewithin as required during system operation of piston heads 72 sealedly fitted to their cylinders. Thus, unit 66 has a first chamber 66a having a cross sectional area matched to that of lower chamber 32b of unit 32, and a lower chamber 66b matched in cross-sectional area to the upper chamber 34a of unit 34. A like relationship exists in unit 68 to the upper and lower chambers respectively of units 32 and 34. Thus, additional conduits 74 and 76 complete the cross connecting pressure circuits from units 66 and 68 to units 32 and 34.

Therefore, taking the example of a cornering maneuver rolling the sprung mass of the vehicle in a manner to compress coil spring 26a, the resulting downward movement tendency of piston rod 38 within unit 32 tends to contract its lower chamber 32b to develop pressure in chamber 66a against the piston head 72 in unit 66 downwardly. Such roll motion of the sprung mass also carries piston rod 38 upwardly within unit 34 and contracts the upper chamber 34a thereof to cause pressurization of the lower chamber 66b of compensating unit 66. All such hydraulic displacement within units 32 and 34 is resisted by the air pressure within accumulator 58 attached to conduit 74. Any oil expelled from the chambers of the two units under the centrifugal force of the sprung mass, and accordingly further displaced from chambers 66b of unit 66, must overcome the pressure in such accumulator selected by the driver. Roll control or stabilization resistance is thus realized.

It is seen that with the presence of units 66 and 68 in the cross connecting circuits between units 32 and 34, variations by the driver of the selected regulated pressure applied to accumulators 58 has no effect upon the vehicle suspension apparatus. With the vehicle at rest, any pressure created in conduits 62 and 74 by the accumulators 58 are transmitted to the upper chambers of units 32 and 34 and which, as exerted on the piston heads and respective cylinder end wall, create a given separating force therebetween. The same pressure applied through conduits 62 and 74 to the lower chambers of units 66 and 68 results in an identical force in the opposite direction in the lower chambers of units 32 and 34 even though pressure is applied to unequal areas therein. This is, of course, the result of unequal areas in the opposed chambers of units 66 and 68 matched to reflect the area inequality in units 32 and 34. Piston heads 72 each exhibit a force which is the product of such operator-selected air pressure times the area of either lower chamber 66b or 68b resulting in a pressure in the other chambers 66a and 68a which is the dividend of such force divided by the different area of the other chamber. The total volume of each unit 66 or 68 should equal that of unit 32 or 34 to avoid hydraulic interference to other suspension operation. But by properly sizing the area of piston rod 70 and head 72 proportionate to that of piston rod 38 and head 40, the unequal area of the chamber of units 32 and 34 is fully compensated.

It is to be noted that our experience has shown that the same prior difficulties attributed to the unequal area of single ended units 32 and 34 when varying the pressure of accumulators 58, also arise during normal road operation of the vehicle over bumps. Such road operation would tend to pump up the cross-connected circuits, just as would the adjustment of regulator valve 54 upwardly, to hold the vehicle sprung mass at a higher level than designed. The system of this invention embodying units 66 and 68 avoids these difficulties as well.

FIG. 3 illustrates a particularized structural embodiment of a portion of the system of FIG. 2, other portions carrying like reference numerals. The compensating units previously described are integrated into a single assembly along with the two air/oil accumulator units and simplify somewhat the plumbing in the cross-connecting circuits for units 32 and 34, such assembly being generally designated as 80. It constitutes a housing 82 including a pair of identical larger diameter bores 84 and 86 each merging with a smaller diameter coaxially aligned bore 88 and 90 respectively. A reciprocable accumulator piston member 92 sealedly fitted in bore 84 includes a reduced diameter guide rod portion 94 received in the bore 88 and including a sealing land 96 reciprocable therein. Guide rod portion 94 is also bored at its distal end as indicated in broken lines to slidably receive the piston rod 98 of a compensating piston head 100. The head 100 and piston rod 98 are sized diametrically to match proportionately the piston head and rod of units 32 or 34 and chambers 88a and 88b equal in total volume the total volume of either such unit. Thus, such piston 100 is constructed within the cross-connecting circuit between units 32 and 34, as in the manner indicated in FIG. 2, by communicating conduit 64 to the compensating chamber 88a, while the opposite compensating chamber 88b containing the piston rod 98 of the compensating unit is communicated by conduit 74 to the upper chamber of unit 34. The construction just described for the element of piston 92 of the accumulator unit and piston 100 of the compensating unit is identically applicable to a piston 106 in bore 86 constituting an accumulator unit, as well as a piston 108 in bore 90 constituting a compensating unit. Again, in the manner generally represented in FIG. 2, the conduit 76 connects the larger area chamber 90a opposite piston 108 with the lower chamber of unit 34, while conduit 62 completes the cross-connection from the opposite smaller chamber 90b of piston 108 to the upper chamber of unit 32.

Pistons 92 and 106 of the accumulator units are selectively pressurized as previously described through conduits 50 from respective on/off valves 56, not shown in FIG. 3. Displacement of these pistons under selected air pressure moves the sealing lands such as 96 in a direction to increase or decrease the volume in the described cross-connect circuits and hence the pressure therein. Thus, for example, sealing land 96 when displaced leftwardly under selected higher air pressure, pressurizes the smaller chamber 88b of piston 100 and conduits 74 and 64 communicates such pressure to the respective chambers of units 32 and 34.

Like action occurs from the simultaneous pressurization of piston 106. Bleed holes 110 are provided at the underside of pistons 92 and 106 to drain any oil which finds its way into the accumulator chambers.

While the foregoing describes only one mode for accomplishing the invention, it will be recognized that alternative means may readily be employed to accomplish the compensating function of this invention. For example, similar expansible chamber devices other than matched piston and cylinder units might be used. In all instances, however, it is contemplated that the single ended piston of the suspension units have means such as described for eliminating the effects of the unequal area of its chambers when cross-connected in the described manner to avoid the described effects. And the principles of the invention apply whether it is directed to roll stabilization systems, pitch stabilization systems, or combinations thereof.

The embodiments of the invention in which an exclusive property or privilege is claimed are defined as follows:

1. In spring suspension apparatus for a vehicle having an unsprung mass with a plurality of road wheels and a sprung mass, a hydraulic stabilizing system including a pair of like piston and cylinder units each applied between said vehicle masses adjacent a respective road wheel and comprising a piston rod attached to the same selected one of such masses and at its inner distal end carrying a piston head relatively moveable within its cylinder and partitioning such unit into opposite chambers of different cross-sectional area, and means cross-connecting each chamber of one said unit in a fluid pressure circuit with said pressure supply means and with the opposite of the corresponding chamber of the other said unit and comprising expansible chamber means operative to compensate for said differential area of said chambers and prevent force in said units between said vehicle masses except in the presence of forces therebetween tending to move said pistons in opposite directions within their cylinders.

2. In spring suspension apparatus for a vehicle having an unsprung mass with a plurality of road wheels and a sprung mass, a hydraulic stabilizing system including a pair of like piston and cylinder units each applied between said vehicle masses adjacent a respective road wheel and comprising a piston rod attached to the same selected one of such masses and at its inner distal end carrying a piston head relatively moveable within its cylinder and partitioning such unit into opposite chambers of different cross-sectional area, variable pressure liquid supply means for pressurizing the chambers of said units to a selected value, and means cross-connecting each chamber of one said unit in a fluid pressure circuit with said pressure supply means and with the opposite of the corresponding chamber of the other said unit and comprising a pair of compensating cylinders each having a piston defining opposite chambers with cross-sectional areas proportional to respective chambers of said units and connected thereto to prevent force in said units between said vehicle masses except in the presence of forces therebetween tending to move said pistons of said units in opposite directions.

* * * * *